(12) United States Patent
Field

(10) Patent No.: US 9,913,198 B2
(45) Date of Patent: Mar. 6, 2018

(54) SYSTEMS AND METHODS FOR ROUTING DATA

(71) Applicant: COMCAST CABLE COMMUNICATIONS, LLC, Philadelphia, PA (US)

(72) Inventor: Brian Field, Evergreen, CO (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 128 days.

(21) Appl. No.: 14/482,675

(22) Filed: Sep. 10, 2014

(65) Prior Publication Data
US 2016/0072708 A1    Mar. 10, 2016

(51) Int. Cl.
| | |
|---|---|
| H04L 12/26 | (2006.01) |
| H04W 40/28 | (2009.01) |
| H04W 40/24 | (2009.01) |
| H04B 7/155 | (2006.01) |
| H04L 12/715 | (2013.01) |
| H04L 12/751 | (2013.01) |
| H04L 12/713 | (2013.01) |
| H04L 12/707 | (2013.01) |
| H04L 12/931 | (2013.01) |

(52) U.S. Cl.
CPC ........ *H04W 40/28* (2013.01); *H04B 7/15592* (2013.01); *H04L 45/02* (2013.01); *H04L 45/64* (2013.01); *H04W 40/246* (2013.01); *H04L 45/22* (2013.01); *H04L 45/586* (2013.01); *H04L 49/00* (2013.01)

(58) Field of Classification Search
None
See application file for complete search history.

(56) References Cited

U.S. PATENT DOCUMENTS

| | | | | |
|---|---|---|---|---|
| 6,157,647 A | * | 12/2000 | Husak | H04L 45/04 370/392 |
| 2002/0146026 A1 | * | 10/2002 | Unitt | H04L 29/06 370/428 |
| 2007/0121655 A1 | * | 5/2007 | Jin | H04L 12/465 370/401 |
| 2008/0259924 A1 | * | 10/2008 | Gooch | H04L 12/4633 370/392 |
| 2010/0322255 A1 | * | 12/2010 | Hao | G06F 9/45558 370/398 |
| 2013/0301473 A1 | * | 11/2013 | Huang | H04L 41/046 370/254 |

(Continued)

*Primary Examiner* — Otis L Thompson, Jr.
(74) *Attorney, Agent, or Firm* — Ballard Spahr LLP

(57) ABSTRACT

Methods and systems for routing data are disclosed. In one aspect, service management can be implemented on one or more computing devices located between at least one router and one or more nodes. The one or more computing devices can be a default gateway for a plurality of user devices. In another aspect, the disclosed methods and systems can use a tag in routing a data block (e.g., service data) via a predefined route. For example, a device can transmit a request for a tag to a network node for routing a data block via a predefined route. Upon receiving the request, the network node can allocate a tag and create an interface. The interface can be associated with the tag and communications between the network node and the device for routing the data block.

20 Claims, 7 Drawing Sheets

(56) References Cited

U.S. PATENT DOCUMENTS

| | | | | |
|---|---|---|---|---|
| 2014/0010073 A1* | 1/2014 | Shah | H04L 45/28 | 370/228 |
| 2015/0092772 A1* | 4/2015 | Copeland | H04L 45/745 | 370/389 |
| 2015/0271268 A1* | 9/2015 | Finkelstein | H04L 67/12 | 370/400 |
| 2015/0281054 A1* | 10/2015 | Utgikar | H04L 49/70 | 709/221 |
| 2015/0381430 A1* | 12/2015 | Deguchi | H04L 41/0896 | 709/224 |
| 2015/0381493 A1* | 12/2015 | Bansal | H04L 45/30 | 370/392 |
| 2016/0028557 A1* | 1/2016 | Dong | H04L 12/4641 | 370/395.53 |

* cited by examiner

SYSTEMS AND METHODS FOR ROUTING DATA

BACKGROUND

When a node is used to deliver services, routers connected to the node need to be managed as there is a trade-off between router port density and functionality. For example, a router with more functionality will typically have less port density and implementing low port density routers can lead to a more expensive network platform. Moreover, when data blocks are transferred from node to node over a network platform, a data block can include a header (which includes large numbers of bits) to indicate how a data block should be routed between nodes over the network. To be able to apply the correct header to a data block, each network node could require logic to perform policy based routing. The process increases the cost and complexity of network architecture. These and other shortcomings are addressed by the present disclosure.

SUMMARY

It is to be understood that both the following general description and the following detailed description are exemplary and explanatory only and are not restrictive, as claimed. Provided are systems and methods for routing data over a network. In one aspect, user or user service management can be implemented on one or more computing devices located between at least one router and one or more nodes, such as fiber nodes. The one or more computing devices can be a default gateway for managing and transmitting user service data. A plurality of virtual machines (VM) can be created or installed on the one or more computing devices to perform user service management. In one aspect, a virtual machine can respond to one user. In another aspect, a virtual machine can correspond to a set of users hosted by the same node. The one or more computing devices can align user service management with a service data forwarding path, thereby improving data routing efficiencies.

In another aspect, the disclosed methods and systems can use a tag in routing a data block via a predefined route. For example, a device can transmit a request for a tag to a network node for routing a data block via a predefined route. Upon receiving the request, the network node can allocate a tag and create an interface associated with the tag. In an aspect, the interface can be associated with communications between the network node and the device for routing the data block.

An example system can comprise at least one router configured for routing data, such as data blocks and one or more computing devices communicatively coupled between the at least one router and one or more nodes. In an aspect, the one or more computing devices can be configured for managing service for a plurality of users, such as subscribers, hosted by the one or more nodes. A plurality of virtual machines can be created or installed on one or more computing devices or associated networks. Each of the plurality of virtual machines can correspond to one or more of the plurality of users. In an aspect, the one or more nodes can be located at one or more intermediate points between the one or more computing devices and a plurality of user devices associated with the plurality of users. The one or more nodes can be configured for relaying service data between the one or more computing devices and the plurality of user devices.

An example method can comprise one or more nodes receiving a first signal, and the first signal can carry service data associated with one or more users. The first signal can be converted to a second signal at the one or more nodes. As an example, the first signal can comprise a radio frequency signal, and the second signal can comprise an optical signal. In an aspect, the second signal can be transmitted to one or more computing devices, wherein a plurality of virtual machines can be installed on the one or more computing devices. The one or more virtual machines of the plurality of virtual machines can be identified to process the service data carried in the second signal, and the processed service data can be carried in a third signal and transmitted to at least one router.

Another example method can comprise utilizing a tag in routing data. The tag can be used to associate a portion of data, such as a data block with a predefined route in a header when the data block is transmitted. For example, a data block can be transmitted between one or more of the plurality of user devices and the one or more nodes. In an aspect, the data routing method can be used between the plurality of user devices and one or more nodes. In another aspect, the data routing can be used between the at least one router and the one or more computing devices. As an example, one of the plurality of user devices can transmit a request for a tag to a node (e.g., a first hop router) for routing a data block via a predefined route. Upon receiving the request, the node can allocate a tag and create an interface associated with the tag. In an aspect, the interface can be dedicated to subsequent communications between the node and the one of the plurality of user devices to route the data block. The node can transmit the tag to the one of the plurality of user devices via the interface. The one of the plurality of user devices can attach the tag to the data block and transmit the tagged data block to the node. Upon receiving the tagged data block via the interface, the node can remove the tag from the data block, attach a header associated with the tag to the data block, and transmit the data block with the header attached to the destination node of the data block according to the routing information in the header.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
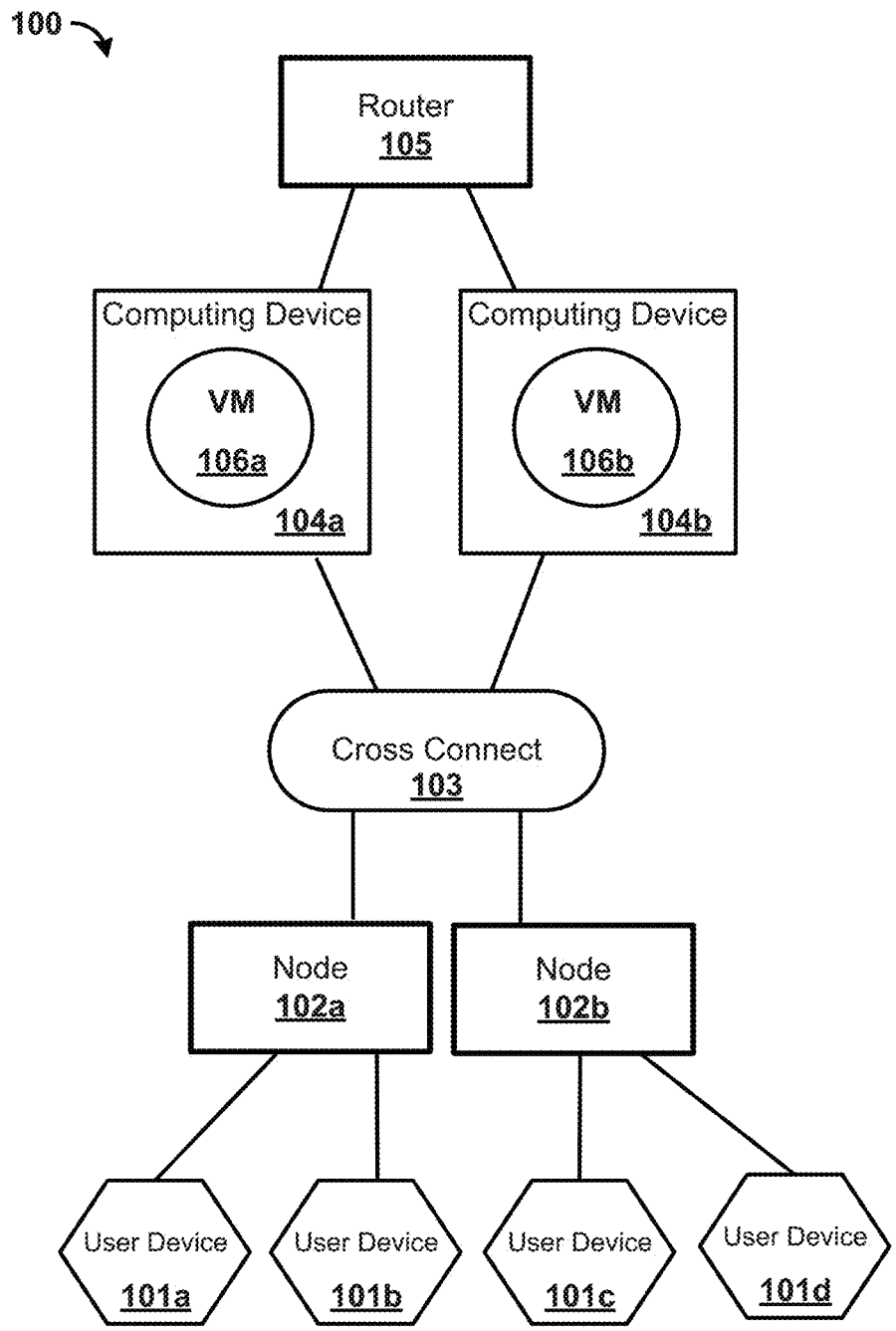
FIG. 1 is a block diagram of an exemplary system in which the present methods and systems can operate.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps, "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, flash memory internal or removable, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps o be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to systems and methods for routing data in a network system. In one aspect, user service management can be implemented on one or more computing devices located between at least one router and one or more nodes. The one or more computing devices can be a default gateway for managing and transmitting user service data. A plurality of virtual machines (VM) can be created or installed on the one or more computing devices to perform user service management. In one aspect, a virtual machine can respond to one user. In another aspect, a virtual machine can correspond to a set of users hosted by the same node. The one or more computing devices can align user service management with a service data forwarding path, thereby improving data routing efficiencies.

In an aspect, the disclosed methods and systems can use an identifier, such as a tag (e.g., WAN tag), in routing a data block via a predefined route. For example, a device can transmit a request for a tag to a network node (e.g., first hop router) for routing a data block via a predefined route. Upon receiving the request, the network node can allocate a tag or another identifier, and create an interface. The interface can be associated with the tag or the identifier. In an aspect, the interface can be a dedicated path associated with communication between the network node and the device for routing the data. The network node can transmit the allocated tag to the device. The device can attach the tag to the data block and transmit the tagged data block to the network node. Upon receiving the tagged data block, the network node can remove the tag from the data block, attach a header associated with the data block to the data block, and transmit the data block with the header attached to a destination node of the data block according to the routing information in the header. In an aspect, content of a tag may not indicate routing information for the data block. As an example, content of a tag can comprise a code, a text, a protocol message, a label, a pattern, a marker, an index, and/or the like. As an example, the tag can be a 12 bit Virtual Local Area Network (VLAN) tag. By contrast, content of a header can indicate routing information for the data block. For example, the header can comprise information address) of a source node that originated the data block, information (e.g., address) of a destination node to which the data block is to be transferred, and other network nodes between the source node and the destination node. A tag and a header can be associated via associating the header to the interface created for the tag. In an aspect, the header associated with the data block can be determined at the device and transmitted to the network node. The header can be received via the interface associated with the tag at the network node. In this scenario, a tag associated with the interface can be removed and the header received via the interface can be attached. In another aspect, the header associated with the data block can be determined at the network node. For example, a data routing application or a hypervisor implemented in the network node can be configured to determine a header for the traffic going through the network node.

association of the data block and a header via a tag and/or interface can enable improvements in the efficiency of communication for routing the data block. For example, a tag can have substantially fewer bits than a header; therefore, transmitting a data block with a tag can be faster than transmitting a data block with a header. Moreover, transfer of smaller data blocks can increase processing throughput for a fixed maximum transmission unit (MTU). Furthermore, cost and complexity of network nodes can be reduced, as network nodes (e.g., a first hop router) do not need to determine which data block needs a header or which header should be applied to the data block.

FIG. 1 is a block diagram of example system 100 for routing data. In an aspect, the system 100 can comprise at least one router 105 configured for routing data blocks. One or more computing devices (e.g., 104a, 104b) can be communicatively coupled between the at least one router 105 and one or more nodes (e.g., 102a, 102b). In an aspect, the one or more computing devices (e.g., 104a, 104b) can be configured for managing service for a plurality of users hosted by the one or more nodes (e.g., 102a, 102b). In an aspect, a plurality of virtual machines (e.g., 106a, 106b) can be created or installed on the one or more computing devices (e.g., 104a, 104b), and each of the plurality of virtual machines can correspond to one or more of the plurality of users. In an aspect, the at least one router 105 and the one or more computing devices (e.g., 104a, 104b) can be located at an upstream portion or facility of a network. For example, the upstream facility can be a hub of a hybrid fiber-coax (HFC) network. As another example, the upstream facility can be a hub of a passive optical network (PON). As an example, the service can comprise one or more of: data service (e.g., data access and delivery), video content service, audio content service, firewalling service, home security service, whitelisting service, blacklisting service, parental control service, data storage, device control (e.g., thermostats, lights, etc.), device monitoring, home monitoring, and the like. In an aspect, managing service can comprise one or more of adding a service, modifying a service, removing a service, responding to a service request, monitoring a path associated with a service, managing a DOCSIS service feature.

In an aspect, the one or more nodes (e.g., 102a, 102b) can be located at one or more intermediate points between the one or more computing devices (e.g., 104a, 104b) and a plurality of user devices (e.g., 101a,101b,101c,101d) associated with the plurality of users. The one or more nodes (e.g., 102a, 102b) can be configured for relaying service data between the one or more computing devices (e.g., 104a, 104b) and the plurality of user devices (e.g., 101a, 101b, 101c, 101d). The system 100 can be applicable to a passive optical network (PON), an HFC network, digital subscriber line (DSL), and the like. As an example, a device (e.g., 101a, 101b, 101c, 101d) can be an electronic user device, such as a computer, a tablet, a mobile device, a game console, a set-top box, a smart phone, a PDA, a gateway device, a server, and the like.

In an aspect, the one or more nodes (e.g., 102a, 102b) can comprise one or more nodes. The one or more nodes (e.g., 102a, 102b) can be implemented with DOCSIS functionality (e.g., PHY access layer, MAC access layer, user management layer), whereas user management functionality can be implemented in the computing devices (e.g., computing device 104a, 104b). Therefore, user management functionality can be treated as a stand-alone feature, rather than combining with PHY and/or MAC. As an example, PRY and/or MAC access layer can be placed in the one or more nodes. In an aspect, a node can receive a first signal from one or more user devices (e.g., user device 101a, 101b, 101c, 101d) and convert the first signal to a second signal. As an example, the first signal can be a radio frequency signal, and the second signal can be an optical signal. The first signal can carry service data associated with one or more users. The second signal can be transmitted to one or more computing devices (e.g., 104a, 104b), wherein the one or more virtual machines of the plurality of virtual machines installed on the one or more computing devices (e.g., 104a, 104b) can be identified to process the service data carried in the second signal. The processed service data can be carried in a third signal and transmitted to at least one router 105.

In an aspect, the one or more computing devices (e.g., 104a, 104b) can he a gateway between a plurality of user devices (e.g., 101a, 101b, 101c, 101d) and the at least one router. For example, the one or more computing devices can he configured for managing service for a plurality of users associated with the plurality of user devices (e.g., 101a, 101b, 101c, 101d). As an example, the one or more computing devices can be configured for managing one or more features for a plurality of users associated with the plurality of user devices (e.g., 101a, 101b, 101c, 101d). As an example, the one or more features can comprise DOCSIS management features, such as access control lists (ACLs), rate limiting, address allocation, and the like. As another example, the one or more computing devices can be configured for managing service for a plurality of users associated with the plurality of user devices (e.g., 101a, 101b, 101c, 101d). As an example, the service can comprise data service (e.g., data access and delivery), home security, firewalling, white listing service, black listing service, parental control service, data storage, device control (e.g., thermostats, lights, etc.), device monitoring, home monitoring, parental control service, data storage, device control (e.g., thermostats, lights, etc.), device monitoring, home monitoring, and the like. As such, services and/or features associated with the plurality of users can be easily personalized for each of the plurality of users. As an example, a feature and/or a service for a user can be added, removed and/or modified via a respective computing device that host the user.

In an aspect, the one or more computing devices (e.g., 104a, 104b) can be configured to manage the plurality of users associated with the plurality of user devices (e.g., 101a,101b, 101c, 101d) via the plurality of virtual machines (e.g., 106a, 106b) installed on the one or more computing devices (e.g., 104a, 104b). As an example, one virtual machine (VM) can correspond to one user. As another example, one virtual machine can correspond to a plurality of users. In an aspect, there can be a plurality of ways in which a feature and/or a service associated with a user can be embedded into a respective virtual machine. In one aspect, full virtualization can be provided, for example, via VMware. A full virtualization can provide complete separation between virtual machines but require high performance resources on the computing device implementing the full virtual machines. In another aspect, para-virtualization can be provided. Para-virtualization can provide formal cooperating between a host operation system (e.g., an operation system on a computing device) and a guest operation system (e.g., an operation system on a virtual machine), which allows for a more efficient utilization of the computing device resources at the cost of some shared software between the host operation system and the guest operation system. In yet another aspect, a form of virtualization refereed as container approach can be provided. The container approach can allow a guest operation system to be shared by all guests (e.g., virtual machines) on a computing device. The container approach can be a more efficient virtualization environment than the para-virtualization. In an aspect, the plurality of virtual machines (e.g., 106a, 106b) can be configured for providing a real-time or near real-time monitoring of data delivery path between the one or more computing device (e.g., 104a, 104b) and a plurality of user devices (e.g., 101a, 101b, 101c, 101d).

In an aspect, at least one computing device can be configured as a back-up server. For example, the system 100 can comprise a network management system. The network management system can be configured to receive data from the plurality of virtual machines (e.g., 106a, 106b). Accordingly, the network management system can have a real time view of the operation of the system 100. For example, in case of a power supply failure, the network management system can move one or more users hosted on the failed computing device to the back-up server operating with redundancy.

In an aspect, the one or more nodes (e.g., 102a, 102b) can be connected to the one or more computing devices (e.g., 104a, 104b) via a cross connect 103. The cross connect 103 can be configured for selectively connecting the one or more nodes (e.g., 102a, 102b) to the at least one of the plurality of computing devices (e.g., 104a, 104b). As an example, the cross-connect 103 can be used to connect one or more nodes from a failed computing device (e.g., 104a) to an available computing device (e.g., 104b). For example, service provider source code, vendor source code, and the like, can be used. In an aspect, the cross-connect 103 can be configured to receive a notification of failure of a first computing device and receive an identifier of an available second computing device. The cross connect 103 can be configured to terminate a connection to the failed computing device and connect to the available second computing device according to the identifier of the available second computing device. For example, a network management system can be used to detect failure of a first computing device (e.g., 104a) and identify a second computing device (e.g., 104b) as an available computing device. A notification of failure of the first computing device and the device identifier of the second computing device can be transmitted from the network management system to the cross connect 103. Accordingly, the cross connect 103 can connect the one or more nodes (e.g., 102a, 102b) to the second computing device (available computing device). In this scenario, one or more virtual machines on the second computing device (e.g., 104b) can be spun up for managing service for a plurality of users (e.g., 101a,101b, 101c, 101d) hosted by the one or more nodes (e.g., 102a, 102b).

In an aspect, the one or more nodes (e.g., 102a, 102b) can be configured to communicate with the one or more computing devices (e.g., 104a, 104b) via a link layer discovery protocol (LLDP). As an example, when a node transmits a LLDP message to one or more computing devices, the LLDP message can comprise an identifier of the respective node. The one or more computing devices that receive the LLDP message can use an IP routing protocol (e.g., border gateway protocol Link State, a HTTP PUTS to a web server) to announce information contained in the LLDP message to the network management systems, such that the network management system can have a real-time accurate view of network topology of the system 100. For example, network topology can comprise mapping of connections between the one or more nodes (e.g., 102a, 102b) and the one or more computing devices (e.g., 104a, 104b).

Figure 2:
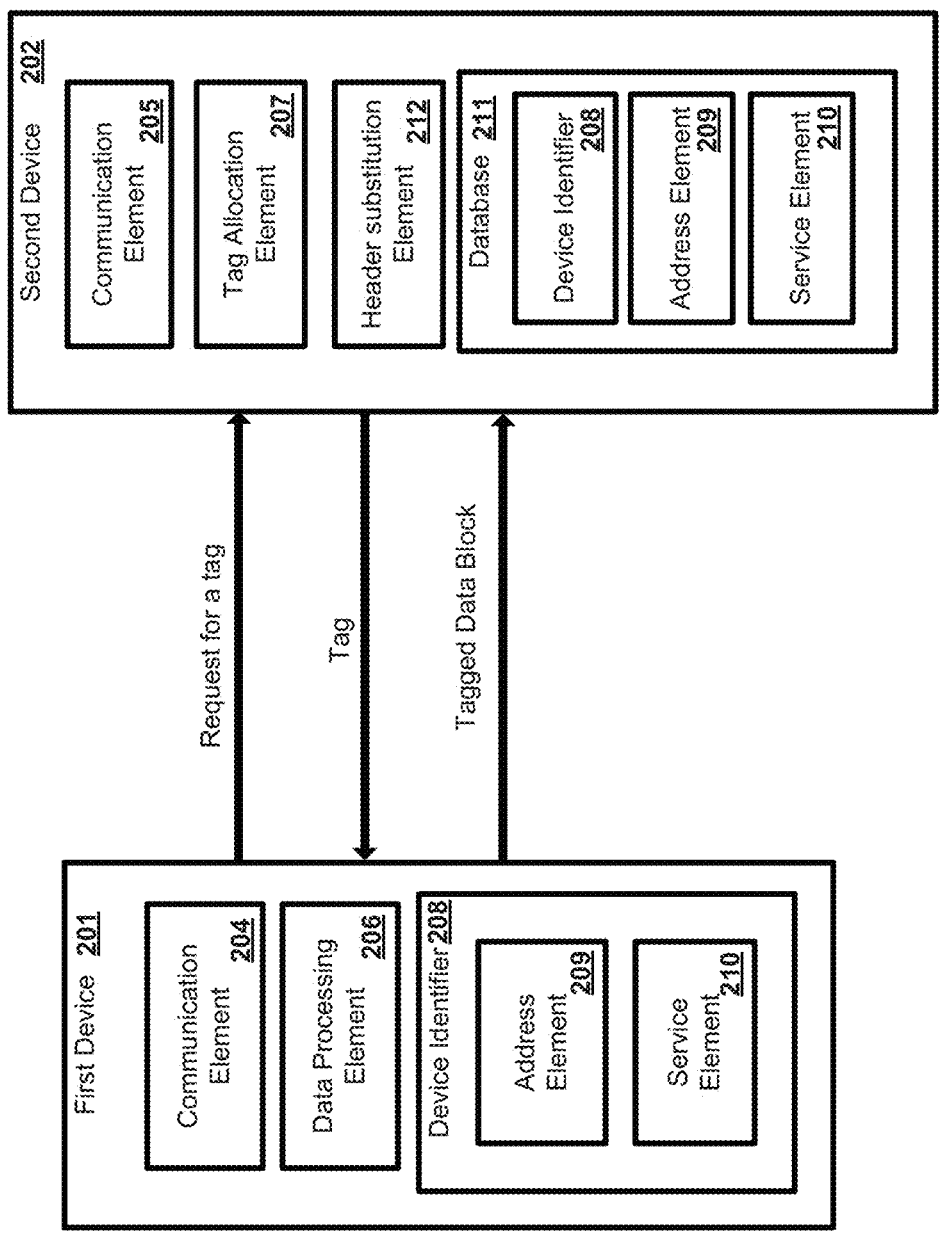
FIG. 2 is a block diagram of another exemplary system in which the present methods and systems can operate.

FIG. 2 is a block diagram of an exemplary system in which the present methods and systems can operate. In an aspect, the first device 201 can be in communication with the second device 202 via a private and/or public network, such as the Internet or a local area network. Other forms of communication can be used, such as wired and wireless telecommunication channels. The second device 202 can be disposed remotely relative to the first device 201. In an aspect, the first device 201 and the second device 202 can be implemented as separate network entities or reside in a common location. In the latter case, the communication between the first device 201 and second device 202 can be performed by way of internal functionality. For example, the communication can be made by sending internal messages, communicating via a communication protocol between devices through direct links, etc.

By way of example, the first device 201 can be a user device (e.g., 101a, 101b, 101c, 101d) in FIG. 1, and the second device 202 can be node 102a or node 102b in FIG. 1. In another aspect, the first device 201 can be a computing device (e.g., 104a, 104b) in FIG. 1, and the second device 202 can be the router 105 in FIG, 1. In yet another aspect, the first device 201 can be a user device (e.g., 101a,101b) in FIG. 1 and the second device 201 can be the router 105 in FIG. 1.

In an aspect, the second device 202 can comprise a server, a switch, a router, a bridge, a repeater, a communication gateway, a session border controller, a boundary device, a network interface, or other network device or system capable of forwarding data blocks (e.g., service data) between route segments. For example, the second device 202 can operate as a proxy server, a communication management server, an application server, a gateway node, a session border controller (SBC), a media gateway control function (MGCF), a data management unit (e.g., an intelligent routing database (IRDB) and the like. In an aspect, the second device 202 can comprise one or more plug-in units (PIUs). For example, a PIU can comprise a modular electronic device that provides any suitable network communication functionality.

The second device 202 can communicate with the first device 201 for providing data and/or services. As an example, services such as network (e.g., Internet) connectivity, media management (e.g., media server), content services (e.g., video gaming), streaming services, broadband services, or other network-related services (e.g., tag allocation service), data routing service. In an aspect, the second device 202 can be configured to interact with other remote resources, such as data, devices, and files.

The network connection between the first device 201 and the second device 202 can comprise a packet switched network, such as interact protocol based network and the like. The network connection can comprise network adapters, switches, routers, and the like, connected through wireless links (e.g., radio frequency, satellite) and/or physical links (e.g., fiber optic cable, coaxial cable, Ethernet cable).

The first device 201 can comprise a communication element 204 for providing an interface to a user to interact with the first device 201 and/or the second device 202. The communication element 204 can be any interface for presenting and/or receiving information to/from the user, such as user feedback. An example interface may be a communication interface, such as a web browser or a program guide to receive a request from a user to transmit a data block (e.g., service data) according to a predefined route. In another aspect, the communication element 204 can request, query or transmit various files related to a communication session from a remote source such as the second device 202. As an example, the communication element 204 can request a tag from the second device 202. As another example, the communication element 204 can receive the tag from the second device 202. As another example, the communication element 204 can transmit one or more tagged data blocks (e.g., user service data) to the second device 202. As another example, a data routing application in the first device 201 can transmit data blocks (e.g., packets, Ethernet frames) and associated application data to the second device 202 via the communication element 204.

In an aspect, the first device 201 can be associated with a user identifier or device identifier 208. As an example, the device identifier 208 can be any identifier, token, character, string, or the like, for differentiating one user or user device from another user or user device. In a further aspect, the device identifier 208 can identify a user or user device as belonging to a particular class of users or user devices. As a further example, the device identifier 208 can comprise information relating to the user device, such as a manufacturer, a model or type of device, a service provider (e.g., routing service provider) associated with the first device 201, a state of the first device 201, a locator, and/or a label or classifier. Other information can be represented by the device identifier 208. In an aspect, the device identifier 208 can be used to locate a nearest node. For example, a request for a tag can be transmitted to the nearest node.

In an aspect, the device identifier 208 can be included in the communication between the first device 201 and the second device 202. For example, the device identifier 208 can be received by the second device 202 as part of the request for a tag When the tag is allocated on the second device 202, the tag can be transmitted to the first device 201 according to its device identifier 208. As another example, the device identifier 208 can be transmitted to the second device 202 when a data block with a tag attached is transmitted. In an aspect, when an interface is created on the second device 202 upon receiving a request for a tag from the first device 201, the device identifier 208 of the first device 201 can be associated with the interface.

In an aspect, the device identifier 208 can comprise an address element 209 and a service element 210. In an aspect, the address element 209 can comprise or provide an internet protocol address, a network address, a media access control (MAC) address, an Internet address, or the like. As an example, the address element 109 can be relied on to establish a communication session between the first device 201 and the second device 202 or other devices and/or networks. As a further example, the address element 209 can be used as an identifier or locator of the device 201. In an aspect, the address element 209 can be persistent for a particular network.

In an aspect, the address element 209 can be used to locate the nearest network node. For example, a request for a tag can be transmitted to the nearest network node. In an aspect, the address element 209 can be included in the communication between the first device 201 and the second device 202. For example, the address element 209 can be received by the second device 202 as part of the request for a tag. When the tag is allocated by the second device 202, the tag can be transmitted to the first device 201 according to its address element 209. As another example, the address element 209 can be transmitted to the second device 202 when a data block with a tag attached is transmitted. In an aspect, when an interface is created by the second device 202 upon receiving a request for a tag from the first device 201, the address element 209 of the first device 201 can be associated with the interface. In an aspect, the interface can be a logical interface dedicated to communication associated with the tag between the second device 202 and the first device 201. In an aspect, the second device 202 can create multiple independent logical interfaces to process requests from multiple devices, according to address element 209 of respective devices. In an aspect, an interface can dynamically collect traffic status associated with the interface (e.g., transaction bytes, time of transaction).

In an aspect, the service element 210 can comprise an identification of a service provider associated with the first device 201 and/or with the class of first device 201. The class of the first device 201 can be related to a type of device, capability of device, type of service being provided, and/or a level of service (e.g., business class, service tier, service package, etc.), type of user (e.g., unlimited subscription, limited subscription, temporary subscription), licensing level (e.g., number of permitted users, number of instances for a user to use a type of service, time span for a user to use a type of service). As an example, the service element 210 can comprise information relating to or provided by a communication service provider (e.g., Internet service provider) that is providing or enabling data flow such as communication services to the first device 201. As a further example, the service element 210 can comprise information relating to a preferred service provider for one or more particular services relating to the first device 201. In an aspect, the address element 209 can be used to identify or retrieve data from the service element 210, or vice versa. As a further example, one or more of the address element 209 and the service element 210 can be stored remotely from the first device 201 and retrieved by one or more devices, such as the first device 201 and the second device 202.

In an aspect, the first device 201 can comprise a data processing element 206. The data processing element 206 can attach a tag (e.g., VLAN tag) received from the second device 202 to a data block to be transferred. In an aspect, the data processing element 206 can determine content and format of a header for the data block to be transferred. For example, a data routing application or a hypervisor can be implemented in the first device 201 to determine the content and format of a header for a data block. The header can be transmitted from the first device 201 to the second device 202. The header can be received at the second device 202 via an interface created for the request for transmitting the data block from the first device 201. For example, the data processing element 206 can determine the device identifier 208 and/or address element 209 of a source and a destination of a data block. As another example, the data processing element 206 can determine the device identifier 208 and/or address element 209 of the network nodes between the source and the destination of a data block.

In an aspect, the second device 202 can manage the communication between the first device 201 and a database 211 for sending and receiving data therebetween. As an example, the database 211 can store a plurality of files (e.g., files associated with tags), user identifiers or records (e.g. network node identifier, user device identifier), or other information. As a further example, the first device 201 can request and/or retrieve a file from the database 211. In an aspect, the database 211 can store information relating to the first device 201 such as the address element 209 and/or the service element 210. As an example, the second device 202 can obtain the device identifier 208 from the first device 201 and retrieve information from the database 211, such as the address element 209 and/or the service element 210. As a further example, the second device 202 can obtain the address element 209 from the first device 201 and can retrieve the service element 210 from the database 211, or vice versa. Any information can be stored in and retrieved from the database 211. The database 211 can be disposed remotely from the second device 202 and accessed via direct or indirect connection. The database 211 can be integrated with the second device 202 or some other device or system.

In an aspect, the second device 202 can comprise a communication element 205 for providing an interface for the second device 202 to interact with the first device 201 and/or other network nodes or route segments. In an aspect, the communication element 205 can request or query various files and/or services from a local source and/or a remote source. In another aspect, the communication element 205 can transmit data to a local or remote device, such as the first device 201. For example, the communication element 205 can receive a tag from a tag allocation element 207 and transmit the tag to the first device 201. As another example, the communication element 205 can transmit a data block (e.g., user service data).

In an aspect, the second device 202 can create an interface when a request for a tag is received from a device e.g., the first device 201), wherein the request is associated with routing data, such as a data block (e.g., user service data). As such, the interface can be associated with the tag. In an aspect, the interface can be dedicated to transmit the data block between the first device 201 and second device 202. For example, a header for transmitting the data block can be transmitted from the first device 201 and received at the second device 202 via the interface. In this scenario, a tag associated with the interface can be removed and the header received via the interface can be attached. In an aspect, the interface can be a logical interface. The second device 202 to create multiple independent logical interfaces to process requests from multiple devices. In an aspect, an interface (e.g., logical interface) can dynamically collect traffic status associated with the interface (e.g., transaction bytes, time of transaction). In an aspect, the interface can be used to keep track of communications associated with a specific tag between the first device 201 and the second device 202. For example, the interface can record transaction bytes of a tag, a tagged data block, and/or a header transmitted via the interface. As another example, the interface can record the time of transmitting a tag, a tagged data block and/or a header. In an aspect, records of interfaces can be used to determine network architecture to improve data routing efficiency. In another aspect, the interface can be terminated by the second device 202 should the first device 201 not send a tagged data block in a predefined time. After the communication associated with the tag between the first device 201 and the second device 202 has ended, the second device 202 can close the interface with the first device 201. Another interface (e.g., logical interface) can be created on the second device 202 when another request for a tag is received from the first device 201, or another device.

As an example, the second device 202 can include a tag allocation element 207 to allocate an unassigned tag upon receiving a request for a tag. In an aspect a tag can be in the form of a code, a text, a protocol message, a label, a pattern, a marker, an index, and/or the like. As an example, the tag can be a 12 bit Virtual Local Area Network (VLAN) tag. As such, 4096 unique VLAN tags can be available for assignment on a single interface. In an aspect, multiple tags (e.g. double tags) can be used in a data block (e.g., a packet, an Ethernet frame). For example, "Q in Q" VLAN tags can be used, which can allow multiple (e.g., two) VLAN tags to be used for a data block. As a result, more than 16 million (e.g., 16777216) VLAN tags can be available for assignment on a single interface. In an aspect, a tag can be allocated based on a device identifier, network address, or geographic location, a VLAN identifier associated of the first device 201. As an example, the tag allocation element 207 can maintain a list of VLAN tags for an interface. When a tag is requested, an unused VLAN tag value can be determined and assigned according to the request. A tag can be used to eliminate the need for a centralized controller.

In an aspect, a data routing application or a hypervisor can be implemented in the second device 202 to determine the content and format of a header for a data block, and to attach a header to a data block. The data routing application can determine a header for its traffic. As such, each time the second device 202 receives a packet with a tag (e.g., VLAN tag); the second device 202 can remove the tag and attached a corresponding header. For example, a data routing application or a hypervisor implemented in the second device 202 can be configured to determine a header for the traffic going through the second device 202. In an aspect, the second device can comprise a header substitution element 212. The header substitution element 212 can remove a tag in a received data block and insert the header for the received data block. The header can be inserted to a predefined location in the received data block. As an example, the header can be inserted between an IPv6 header and transport payload of received data blocks and forward the received data blocks according to the inserted header.

The disclosed method and systems can be used in the multi-tenant cloud space where there is a need for isolation between tenants. This segment routing mechanism can not only provide separation, but also can provide service chaining.

It should be noted the present disclosure can be applicable in any network environment employing a computing device, a server, a user device or other network entity that is involved in the management of sessions between devices on the network. In order to facilitate an understanding of the disclosure, particular examples of network environments are described herein. However, the present disclosure is not limited thereto and is equally applicable to other analogous network environments as will be readily apparent to those skilled in the art from the description provided herein.

Figure 3:
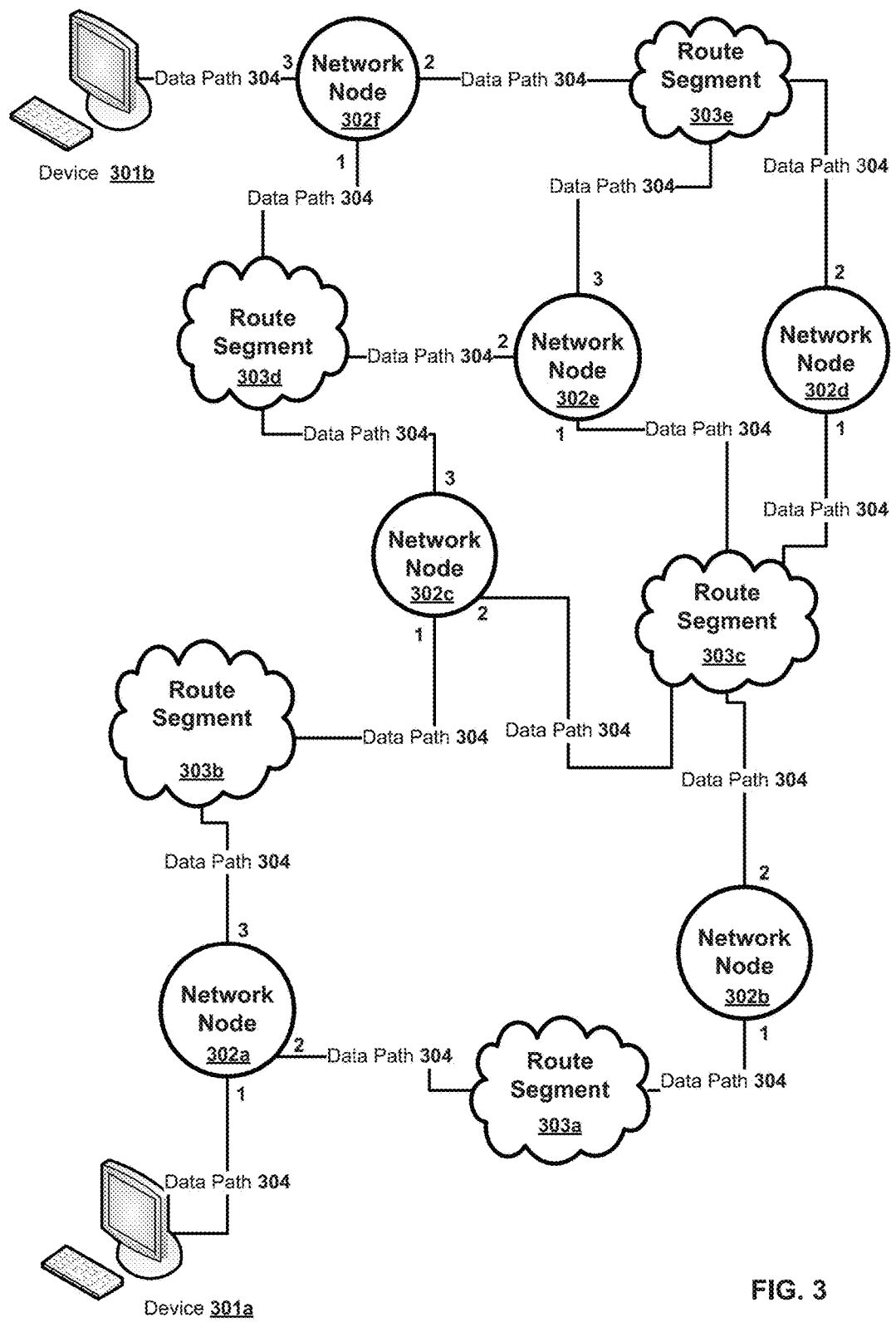
FIG. 3 is a block diagram of yet another exemplary system in which the present methods and systems can operate.

FIG. 3 illustrates various aspects of another exemplary environment in which the present methods and systems can operate. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

An example system can comprise devices 301a and 301b, a plurality of network nodes 302a,b,c,d,e,f,and route segments 303a,b,c,d,e,deployed between the devices 301a and 301b. In an aspect, the device 301a can be configured to originate the routing of a data block as its source, the device 301b can be configured to receive the data block as its destination. As an example, a device (e.g., 301a, 301b) can be a user device, a subscriber device, a network device, a server, a gateway device, a computer, a tablet, a mobile device, a game console, a set-top box, a smart phone, a PDA, and the like. In an aspect, a data block can comprise an atomic unit of data, such as a packet, an Ethernet frame, and the like. As an example, the data block can comprise service data associated with a user or a user device (e.g., 301a, 301b). In another aspect, routing information can be stored in a header of the data block. For example, the header can comprise information about the source node that originated the data block, information about the destination node to which the data block is to be transferred, and other network nodes between the source node and the destination node. In an aspect, the header can comprise an Internet Protocol (IP) packet header.

In another aspect, the header can comprise an Ethernet packet header.

In an aspect, network nodes 302a,b,c,d,e,f can be used to connect two or more data paths 304. In an aspect, a network node (e.g., 302a) can read the routing information (e.g., 301a-302a-302c-302f-301b) in the header of a data block to determine a next network node (e.g., 302b,c,d,e,f) in the data paths 304, and then direct the data block to the next network node via one or more route segments (e.g., 303a,b,c,d,e). As an example, a network node can be a server, a switch, a router, a bridge, a repeater, a communication gateway, a session border controller, a boundary device, a network interface, customer premises equipment (CPE), headend, a cable modem termination system (CMTS) or any network device or system capable of forwarding data blocks between route segments (e.g., 303a,b,c,d,e). In an aspect, the network nodes 302a,b,c,d,can comprise protocol translators, impedance matching devices, rate converters, fault isolators, and/or signal translators connections, or the like, as necessary to provide system interoperability between different route segments. For example, the network nodes 302a,b,c,d,e,f can be used to establish mutually acceptable administrative procedures between different route segments (e.g. 303a,b,c,d,e). As an example, the network nodes 302a,b,c,d,e,f can represent a plurality of interfaces, boundaries of a domain on a given Ethernet virtual connection (EVC) of a carrier Ethernet network, and/or boundaries of a domain on a label switched path (LSP) in MPLS networks. In an aspect, each network node can comprise a plurality of ports (e.g., port 1, port 2, port 3) to receive and transmit a data block. For example, the network node 302a can comprise three ports: port 1 can be connected to the device 301a, port 2 can be connected to the route segment 303a,and port 3 can be connected to the route segment 303b. In an aspect, network nodes 302a,b,c,d,e,f can be configured as a mesh network.

In an aspect, route segments 303a,b,c,d,e can comprise a private and/or public network, such as the Internet, a local area (LAN) network, metropolitan area network (MAN), a wide area network (WAN) and the like. By way of example, a route segment can comprise a public switched telephone network (PSTN) system, a public land mobile network (PLMN) system, a wireless distribution system, a wired or cable distribution system, a coaxial cable distribution system, an ultra high frequency (UHF) or very high frequency (VHF) radio frequency system, a satellite or other extraterrestrial system, a cellular distribution system, a power-line broadcast system, a fiber optic network, or any combinations of these systems and/or networks. In an aspect, the route segments 303a,b,c,d,e can comprise a plurality of network devices, such as network adapters, switches, and/or routers, connected through wireless links (e.g., radio frequency, satellite) and/or physical links (e.g., fiber optic cable, coaxial cable, Ethernet cable).

In an aspect, a network node (e.g., network node 302a) can be selected as a first hop router according to a routing protocol for routing a data block originating from the device 301a. In an aspect, a routing protocol can comprise dynamic protocols, such as RIP 1 , RIP 2 , OSPF, EIGRP, IS-IS, BGP, static routing, and the like. In an aspect, a first hop router for a device (e.g., device 301a) can be selected from a plurality of network nodes by mapping an IP address of the device to IP addresses of the plurality of network nodes. In another aspect, geographic information (e.g., geo-spatial proximity) of the device and network nodes can be used to select a first hop router. For example, the network node closest to the device can be used as a first hop router. As another example, anode (e.g., fiber node) can host a plurality of user devices. A first portion of the plurality of user devices can be associated with sports video content, a second portion of the plurality of user devices can be associated with news content, and a third portion of the plurality of user devices can be associated with children content. A first network node can be used as a first hop router for sports content, a second network node can be used as a first hop router for news content, and a third network node can be used as a first hop router for children's content.

In an aspect, a first hop router can serve as an edge server between device 301a and other network nodes along a routing path. As an example, the network node 302a can be used as the first hop router to transmit a data block originating from the device 301a. In an aspect, the network node 302a can be implemented with one or more communication protocols capable of communicating with the device 301a. The network node 302a can be disposed locally or remotely relative to the device 301a. For example, the device 301a can transmit a request for a tag to the network node 302a for routing a data block via a predefined route. As an example, a predefined route can comprise network addresses of a source, a destination, and one or more network nodes between the source and the destination of the data block (e.g., 301a-302a-302c-302f-301b). Information on a predefined route can be stored in a header associated with the data block. Upon receiving the request, the network node 302a can allocate a tag and create an interface associated with the tag. As an example, the tag can comprise a code, a text, a protocol message, a label, a pattern, a marker, an index, and/or the like. As an example, the tag can be a 12 bit Virtual Local Area Network (WAN) tag. As such, 4096 unique VLAN tags can be available for assignment on a single interface. In an aspect, multiple tags (e.g. double tags) can be used in a data block (e.g., a packet, an Ethernet frame). For example, "Q in Q" VLAN tags can be used, which can allow multiple (e.g., two) WAN tags to be used for a data block. As a result, more than 16 million (e.g., 16777216) VLAN tags can be available for assignment on a single interface. The interface can be used for subsequent communication with the device 301a for routing the data block. In an aspect, the network node 302a can transmit the tag to the device 301a. The device 301a can attach the tag to the data block and transmit the tagged data block to the network node 302a. The network node 302a can remove the tag from the data block, attach a header associated with the tag to the data block, and transmit the data block with a header attached to the destination (e.g. device 301b) according to the routing information in the header. The header can comprise predefined routing information (e.g., 301a-302a-302c-302f-301b) for routing the data block. In an aspect, the header can comprise an Internet Protocol (IP) packet header. In another aspect, the header can comprise an Ethernet packet header.

In an aspect, a network node can serve as a first hop router for a plurality of devices. In such a scenario, a device identifier and/or device network address can be included in a request for a tag transmitted from a device, so that when a request is received by the network node, the network node can associate the request with a specific device according to the device identifier and/or device network address.

In an aspect, data paths 304 can be used to connect two network devices (e.g., device 301a, 301b, network nodes 302a,b,c,d,e,f). In an aspect, data path 304 can comprise one or more uninterrupted communication links, sequential links, pre-defined paths or links, and/or intervening nodes. Links can comprise single point-to-point connections between two devices or access points. In an aspect, data paths 304 can be configured to transmit one or more types of content and/or service. In an aspect, a data path 304 can aggregate a plurality of traffic types from multiple independent interfaces into a single physical connection, in other words, there can be a logical division within a data path 304.

In an aspect, the communications between the devices (e.g., between device 301a and network node 302a, between network node 302a and network node 302b) can utilize one or more of hypertext transfer protocol (HTTP), Transmission Control Protocol (TCP). Internet Protocol (IP), File Transfer Protocol (FTP), Telnet, Hypertext Transfer Protocol Secure (HTTPS), Session Initiation Protocol (SIP), Simple Object Access Protocol (SOAP), Extensible Markup Language (XML) and variations thereof, Simple Mail Transfer Protocol (SMTP), Real-Time Transport Protocol (RTP), User Datagram Protocol (VIP), Global System for Mobile Communications (GSM) technologies, Code Division Multiple Access (CDMA) technologies, Evolution Data Optimized Protocol (EVDO). Internet Group Management Protocol (IGMP), Real Time Streaming Protocol (RTSP), Time Division Multiple Access (TDMA) technologies, radio frequency (RF) signaling technologies, wireless communication technologies (e.g., Bluetooth, Wi-Fi, etc.) and other suitable communications technologies.

Figure 4:
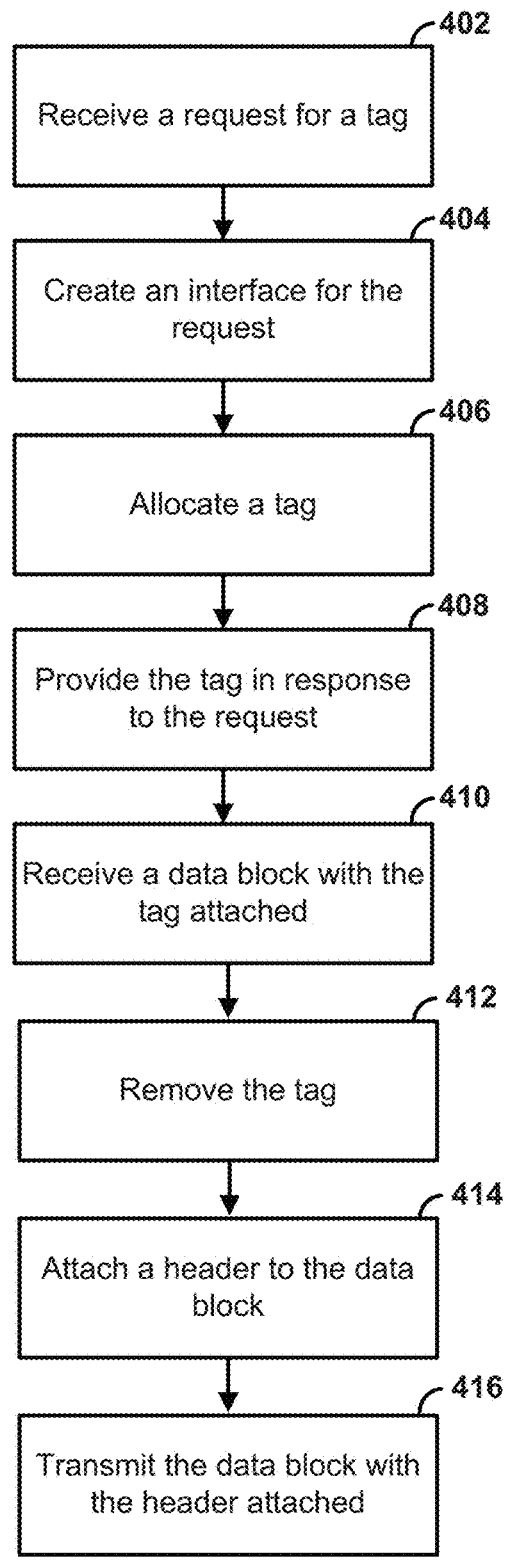
FIG. 4 is a flowchart illustrating an example method for routing data.

FIG. 4 is a flow chart illustrating an example method. At step 402, a request for a tag can be received, wherein the request can be associated with routing a data block via a predefined route. In an aspect, the request can comprise the predefined route. For example, the request can comprise addresses (e.g., device identifier 208, address element 209) of one or more network nodes between the data block source and the data block destination in a network. In an aspect, the predefined route can be used by the request receiver to determine a header for transmitting the data block. For example, the second device 202 can receive a request for a tag from the first device 201. As an example, the first device 201 can be an electronic device, such as a computer, a tablet, a mobile device, a game console, a set-top box, a smart phone, a PDA, a user device, and the like. As another example, the second device 202 can comprise a server, a switch, a router, a bridge, a repeater, a communication gateway, a session border controller, a boundary device, a network interface, a customer premises equipment (CPE), a headend, cable modem termination system (CMTS) or other network device or system capable of forwarding data blocks. In an aspect, the data block can comprise atomic unit of data, such as a packet, an Ethernet frame, and the In an aspect, the request can be transmitted via a hypertext transfer protocol (HTTP) Session initiation Protocol (SIP), Simple Object Access Protocol (SOAP), Extensible Markup Language (XML) and variations thereof, Simple Mail Transfer Protocol (SMTP), Real-Time Transport Protocol (RTP), User Datagram Protocol (UDP), Global System for Mobile Communications (GSM) technologies, Code Division Multiple Access (CDMA) technologies, Evolution Data Optimized Protocol (EVDO). Internet Group Management Protocol (IGMP), Real Time Streaming Protocol (RTSP), Time Division Multiple Access (TDMA) technologies, radio frequency (RF) signaling technologies, wireless communication technologies (e.g., Bluetooth, Wi-Fi, etc.) and other suitable communications protocols, At step 404, an interface can be created for the request. In an aspect, the interface can be a logical interface. The interface can be created on the request receiver (e.g., second device 202). In an aspect, the interface can be dedicated to subsequent communication between the request (the second device 202) and the request transmitter (e.g., first device 201). In an aspect, the second device 202 can create multiple independent logical interfaces to process requests from multiple devices. In an aspect, an interface (e.g., a logical interface) can dynamically collect traffic status associated with the interface (e.g., transaction bytes, transaction time)

At step 406, a tag can be allocated. In an aspect, the second device 202 can comprise a plurality of tags. When a tag is not used for a data routing transaction, it can be marked as an unassigned tag. When a tag is used for a data routing transaction, it can be marked as an assigned tag. A tag can be reused. For example, when a data routing transaction finishes, the tag assigned to the finished data routing transaction can be marked as an unassigned tag, ready for an assignment for a next data routing transaction. For example, upon receiving the request, the second device 202 can allocate an unassigned tag. In an aspect, a tag can be in form of a code, a text, a protocol message, or the like. In an aspect, the tag can comprise a 12-bit virtual local area network (VLAN) tag. In another aspect, the tag can comprise multiple VLAN tags (e.g., "Q in Q" VLAN tags). In this case, there can be more than 16 million VLAN tags available for allocation. The allocated tag can be associated with the interface created for the request.

At step 408, the tag can be provided in response to the request. In an aspect, the tag can be provided by the second device 202 in response to the request from the first device

201. Upon receiving the tag, the first device 201 can attach the tag to the data block in the data processing element 206. As an example, a VLAN tag can be attached to a predefined location of the data block (e.g., an Ethernet frame). In an aspect, the provided tag can be an indication that an interface has been created and associated with the tag.

At step 410, the data block with the tag attached can be received via the interface. In an aspect, the tagged data block can be transmitted from the first device 201 to the second device 202. In an aspect, the tagged data block can be received via the interface at the second device 202 by identifying the tag in the transaction. In an aspect, the tagged data block can be transmitted along with the device identifier 208 and/or address element 209 of the first device 201.

At step 412, the tag can be removed. In an aspect, upon receiving the data block with the tag attached, the second device 202 can remove the tag from the data block. As an example, a VLAN tag attached to a predefined location of the data block (e.g., an Ethernet frame) can be removed.

At step 414, a header associated with the tag can be attached to the data block. In an aspect, the header can be inserted at a predefined location of the data block. In an aspect, the predefined location for the header can be different from the predefined location for tag. In an aspect, the header can be inserted at a predefined location between an IPv6 header and transport payload of the data block. In an aspect, the header can comprise a predefined route for routing the data block. As an example, the header can comprise addresses of the source and destination of the data block. As another example, the header can further comprise addresses of one or more nodes between the data block source and the data block destination in the network. In an aspect, the header can comprise an Internet Protocol (IP) packet header. In another aspect, the header can comprise an Ethernet packet header.

In an aspect, the header for the data block can be determined at the first device 201. For example, the data processing element 206 on the first device 201 can determine content and format of a header for the data block to be transferred. The header can be transmitted from the first device 201 to the second device 202. The header can be transmitted via the interface created for the request for transmitting the data block. In an aspect, a data routing application or a hypervisor implemented in the second device 202 can determine a header for the data block. For example, the data routing application or the hypervisor can determine headers for traffics going through the second device 202.

At step 416, the data block with the header attached can be transmitted. The data block with the header attached can be transmitted according to information in the header. For example, the data block with the header attached can be transmitted according to addresses of the source and destination of the data block in the header.

Figure 5:
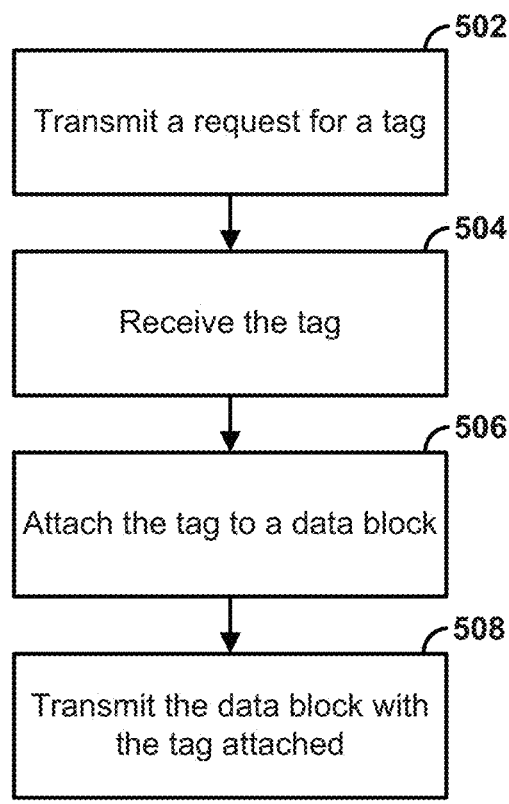
FIG. 5 is a flowchart illustrating another example method for routing data.

FIG. 5 is a flow chart illustrating another example method. At step 502, a request for a tag can be transmitted. In an aspect, the request can be associated with routing a data block via a predefined route. A predefined route can comprise network addresses of a source, a destination, and one or more network nodes between the source and the destination of the data block. Information on a predefined route can be stored in a header associated with the data block. For example, first device 201 can send a request for a tag to the second device 202. As an example, the first device 201 can be an electronic device, such as a computer, a tablet, a mobile device, a game console, a set-top box, a smart phone, a PDA, and the like. As another example, the second device 202 can comprise a server, a switch, a router, a bridge, a repeater, a communication gateway, a session border controller, a boundary device, a network interface, a customer premises equipment (CPE), a headend, cable modem termination system (CMTS) or other network device or system capable of forwarding data blocks. In an aspect, the data block can comprise atomic unit of data, such as a packet, an Ethernet frame, and the like.

In an aspect, the request can comprise device identifier 208 and/or address element 209 of the first device 201. In an aspect, the request can be made via a hypertext transfer protocol (HTTP), Transmission Control Protocol (TCP). Internet Protocol (IP), File Transfer Protocol (FTP), Telnet, Hypertext Transfer Protocol Secure (HTTPS), Session Initiation Protocol (SIP), Simple Object Access Protocol (SOAP), Extensible Mark-up Language (XML) and variations thereof, Simple Mail Transfer Protocol (SMTP), Real-Time Transport Protocol (RTP), User Datagram Protocol (UDP), Global System for Mobile Communications (GSM) technologies, Code Division Multiple Access (CDMA) technologies, Evolution Data Optimized Protocol (EVDO). Internet Group Management Protocol (IGMP), Real Time Streaming Protocol (RTSP), Time Division Multiple Access (TDMA) technologies, radio frequency (RF) signaling technologies, wireless communication technologies (e.g., Bluetooth, Wi-Fi, etc.) and other suitable communications protocols.

Upon receiving the request, the second device 202 can allocate an unassigned tag and create an interface to associate with the tag. In an aspect, the interface can be a logical interface. In an aspect, the interface can be dedicated to subsequent communication associated with the tag between the second device 202 and the first device 201. In an aspect, the second device 202 can create multiple independent logical interfaces to process requests from multiple devices according to the device identifier and/or address element of the respective multiple devices. In an aspect, an interface (e.g., logical interface) can dynamically collect traffic status associated with the interface (e.g., transaction bytes, transaction time).

At step 504, the tag can be received. In an aspect, the tag can be received by the first device 201 from the second device 202. As an example, a tag can comprise a code, a label, a text, a protocol message, a pattern, a marker, an index, and/or the like. In an aspect, the tag can comprise a 12 bit virtual local area network (VLAN) tag. In another aspect, the tag can comprise multiple VLAN tags (e.g., "Q in Q" VLAN tags), For two VLAN tags, there can be more than 16 million unique VLAN tags available for routing data blocks. In an aspect, the tag can be an indication that an interface has been created on the second device 202 for subsequent communication associated with the tag between the first device 201 and the second device 202.

At step 506, the tag can be attached to the data block. In an aspect, the first device 201 can attach the tag to the data block in data processing element 206. For example, a data routing application or hypervisor implemented on the data processing element 206 can attached the tag to the data block. As an example, a VLAN tag can be attached to a predefined location of the data block (e.g., an Ethernet frame).

At step 508, the data block with the tag attached can be transmitted. In an aspect, the tagged data block can be transmitted from the first device 201 to the second device 202. As such, the tagged data block can be received via the interface created based on the tag on the second device 202. In an aspect, upon receiving the data block with the tag attached, the second device 202 can remove the tag from the data block, attach a header associated with the tag to the data block, and transmit the data block with the header attached. In an aspect, the second device 202 can determine a predefined route for routing the data block. After the data block with the header attached is transmitted, the second device 202 can close the interface with the first device 201. In another aspect, the interface can remain open to receive further data blocks with attached tags. Another interface can be created on the second device 202 when another request for a tag is received from the first device 201.

In an aspect, the header can comprise the predefined route for routing the data block. As an example, the header can comprise a network address of the source and a network address of the destination of the data block. As another example, the header can further comprise addresses of one or more network nodes between the source of the data block and the destination of the data block. In an aspect, the header can comprise an Internet Protocol (IP) packet header. In another aspect, the header can comprise an Ethernet packet header.

Figure 6:
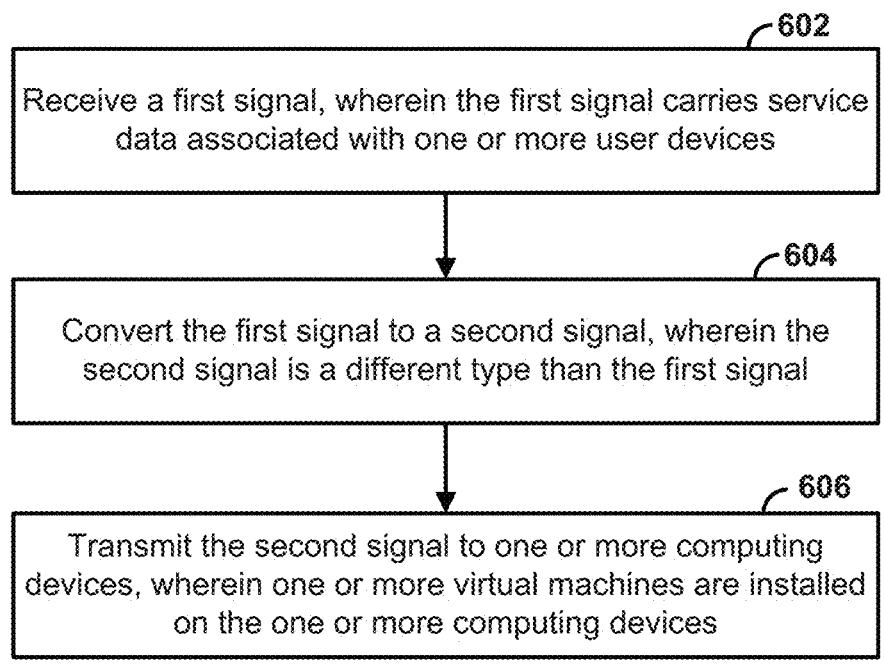
FIG. 6 is a flowchart illustrating yet another example method for routing data.

FIG. 6 is a flow chart illustrating another example method. At step 602, a first signal can be received. For example, the first signal can be received at one or more nodes 102a, 102b, as illustrated in FIG. 1. In an aspect, the first signal can be a radio frequency signal, and wherein the first signal carries service data associated with one or more users. As an example, the service data can comprise one or more of: data service (e.g., data access and delivery), video content service data, audio content service data, firewalling service data, home security service data, whitelisting service data, blacklisting service data, parental control service data, data storage, device control (e.g., thermostats, lights, etc.), device monitoring, home monitoring, and the like.

At step 604, the first signal can be converted to a second signal, different from the first signal. The first signal can be converted at the one or more nodes that receive the first signal (e.g., 102a, 102b). In an aspect, the second signal can be converted to an optical signal. For example, the first signal can be a modulated RF signal ranging from 5-65 MHz and the second signal can be at optical wavelength 1550 nm. The second signal can comprise the same service data as in the first signal.

At step 606, the second signal can be transmitted to one or more computing devices. For example, the second signal can be transmitted to one or more computing devices 104a and 104b, as illustrated in FIG. 1. In an aspect, one or more virtual machines can be installed on the one or more computing devices. The one or more virtual machines can be used to process the service data carried in the second signal. For example, processing the service data can comprise one or more of adding a service, modifying a service, removing a service, responding to a service request, monitoring a path associated with a service, managing a DOCSIS service feature, and the like.

In an aspect, the processed service data can be carried in a third signal and transmitted to at least one router, for example, router 105. In an aspect, the third signal can be an opticals signal. The third signal can be transmitted via a link layer discovery protocol (LLDP). As an example, when a node (e.g., 102a) transmits a third signal to one or more computing devices, the third signal can comprise an identifier of the respective node (e.g., 102a). The one or more computing devices that receive the third signal can use an IP routing protocol (e.g., border gateway protocol) to announce information contained in the LLDP message to a network management systems, such that the network management system can have a real-time accurate view of system operation.

In an aspect, the at least one router (e.g., 105) and the one or more computing devices (e.g., 104a, 104b) can be located at an upstream facility. As an example, the upstream facility can comprise a hub of a hybrid fiber-coax (HFC) network. As another example the upstream facility can comprise a hub of a passive optical network (PON).

Figure 7:
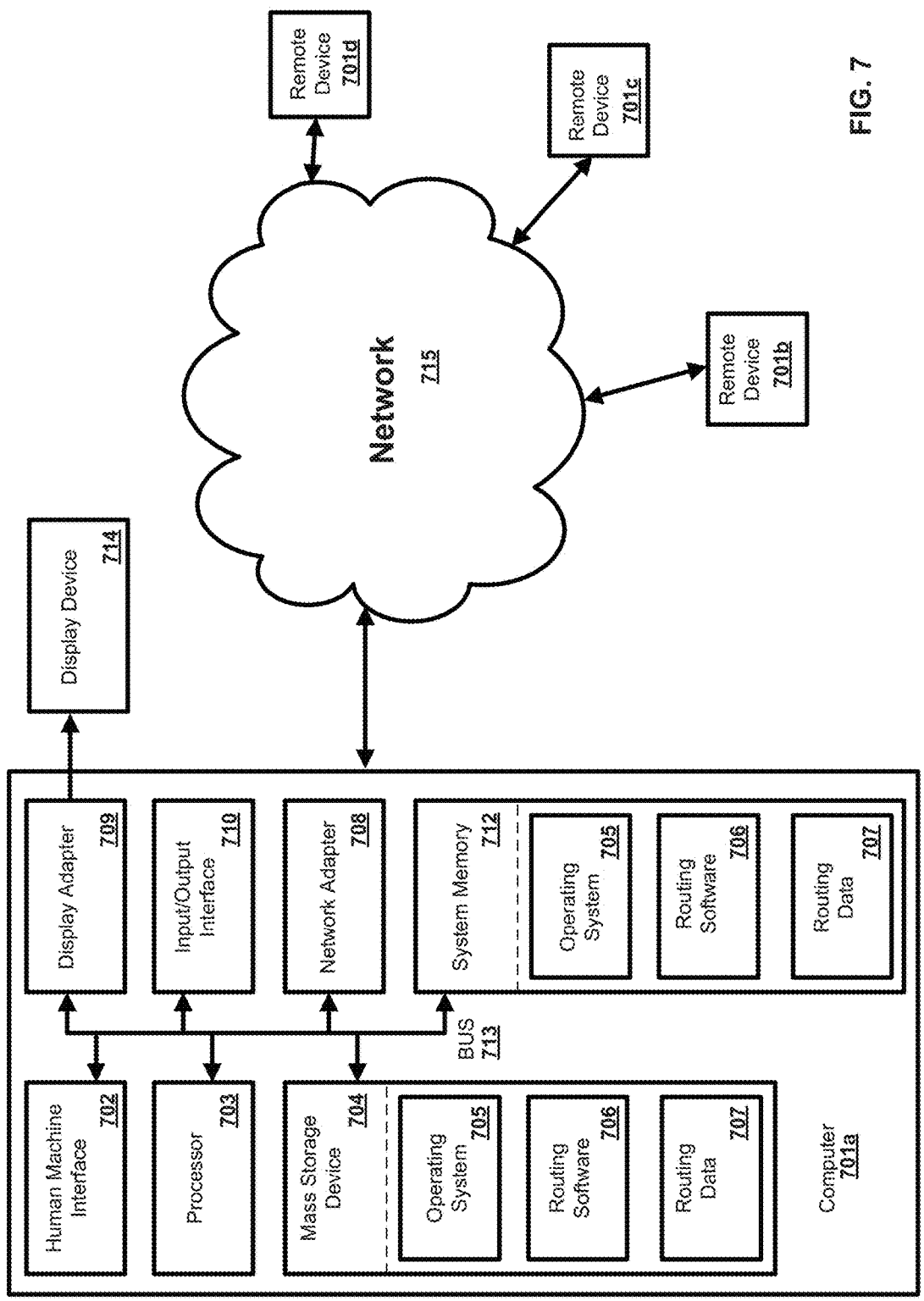
FIG. 7 is a block diagram illustrating an example computing device in which the present methods and systems can operate.

FIG. 7 is a block diagram illustrating an exemplary operating environment for performing the disclosed methods. In an exemplary aspect, the methods and systems of the present disclosure can be implemented on computer 701 as illustrated in FIG. 7 and described below. By way of example, user device 101a, 101b in FIG. 1 can be computer 701 as illustrated in FIG. 5. As another example, nodes 102a, 102b, computing device 104a and 104b, router 105 can be remote device 701a,b,c, as illustrated in FIG. 7. Similarly, the methods and systems disclosed can utilize one or more computing devices to perform one or more functions in one or more locations. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 701. The components of the computer 701 can comprise, but are not limited to, one or more processors 703, a system memory 712, and a system bus 713 that couples various system components including the processor 703 to the system memory 712. In the case of multiple processors 703, the system can utilize parallel computing.

The system bus 713 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and each of the subsystems, including the processor 703, a mass storage device 704, an operating system 705, routing software 706, routing data 707, a network adapter 708, system memory 712, an Input/Output Interface 710, a display adapter 709, a display device 711, and a human machine interface 702, can be contained within one or more network nodes 714a,b,c at physically separate locations, connected through buses of this form, in effect implementing a fully distributed system.

The computer 701 typically comprises a variety of computer readable media. Exemplary readable media can be any available media that is accessible by the computer 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data, such as routing data 707, and/or program modules, such as operating system 705 and routing software 706, that are immediately accessible to and/or are presently operated on by the processor 703.

In another aspect, the computer 701 can also comprise other removable/non-removable, volatile/non-volatile computer storage media. By way of example, FIG. 7 illustrates a mass storage device 704 which can provide non-volatile storage of computer code, computer readable instructions, data structures, program modules, and other data for the computer 701. For example and not meant to be limiting, a mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, an operating system 705 and routing software 706. Each of the operating system 705 and routing software 706 (or some combination thereof) can comprise elements of the programming and the routing software 706. Routing data 707 can also be stored on the mass storage device 704. Routing data 707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 701 via an input device (not shown). Examples of such input devices comprise, but are not limited to, a keyboard, pointing device (e.g., a "mouse"), a microphone, a joystick, a scanner, tactile input devices, such as gloves, and other body coverings, and the like. These and other input devices can be connected to the processor 703 via a human machine interface 702 that is coupled to the system bus 713, but can be connected by other interface and bus structures, such as a parallel port, game port, an IEEE 1394 Port (also known as a Firewire port), a serial port, or a universal serial bus (USB).

In yet another aspect, a display device 711 can also be connected to the system bus 713 via an interface, such as a display adapter 709. It is contemplated that the computer 701 can have more than one display adapter 709 and the computer 701 can have more than one display device 711. For example, a display device can be a monitor, an LCD (Liquid Crystal Display), or a projector. In addition to the display device 711, other output peripheral devices can comprise components, such as speakers (not shown) and a printer (not shown) which can be connected to the computer 701 via Input/Output Interface 710. Any step and/or result of the methods can be output in any form to an output device. Such output can be any form of visual representation, including, but not limited to, textual, graphical, animation, audio, tactile, and the like. The display 711 and computer 701 can be part of one device, or separate devices.

The computer 701 can operate in a networked environment using logical connections to one or more network nodes 714a,b,c. By way of example, a network node can be a personal computer, portable computer, smartphone, a server, a router, a network computer, a peer device or other common network node, and so on. Logical connections between the computer 701 and a network node 714a,b,c can be made via a network 715, such as a local area network (LAN) and/or a general wide area network (WAN). Such network connections can be through a network adapter 708. A network adapter 708 can be implemented in both wired and wireless environments. Such networking environments are conventional and commonplace in dwellings, offices, enterprise-wide computer networks, intranets, and the Internet.

For purposes of illustration, application programs and other executable program components, such as the operating system 705 are illustrated herein as discrete blocks, although it is recognized that such programs and components reside at various times in different storage components of the computing device 701, and are executed by the data processor(s) of the computer. An implementation of routing software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information, such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence techniques, such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swami intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   transmitting a first signal to one or more computing devices, wherein one or more virtual machines are installed on the one or more computing devices, and wherein the one or more virtual machines are identified to process service data carried in the first signal, the service data being associated with one or more users;
   transmitting, by the one or more computing devices, to at least one router comprising at least one first hop router, a second signal comprising processed service data and a request for a tag associated with routing a data block via a predefined route;
   receiving, by the one or more computing devices, the tag from the at least one first hop router, wherein the tag is associated with an interface;
   transmitting, by the one or more computing devices, a header corresponding to the tag to the at least one first hop router via the interface;
   attaching, by the one or more computing devices, the tag to the data block; and
   transmitting, by the one or more computing devices, the data block with the tag attached to the at least one first hop router, wherein the data block with the tag attached is received via the interface, wherein the at least one first hop router removes the tag and attaches the header corresponding to the tag to the data block according to the interface.

2. The method of claim 1, wherein processing the service data comprises one or more of adding a service, modifying a service, removing a service and responding to a service request.

3. The method of claim 2, wherein the service comprises one or more of: data service, video content service, audio content service, firewalling service, data storage, device control, or device monitoring.

4. The method of claim 1, wherein transmitting the first signal to the one or more computing devices comprises transmitting the first signal to the one or more computing devices via a cross-connect.

5. The method of claim 4, wherein the cross-connect is configured for transmitting the first signal to a specific computing device of the one or more computing devices.

6. The method of claim 1, wherein the at least one first hop router is configured for:
   receiving the request for the tag from the one or more computing devices, wherein the request is associated with routing the data block via the predefined route
   creating the interface for the request;
   allocating the tag, wherein the tag is associated with the interface;
   providing the tag to the one or more computing device in response to the request for the tag;
   receiving the header corresponding to the tag from the one or more computing devices via the interface;
   receiving the data block with the tag attached via the interface;
   selecting the header corresponding to the tag; and
   transmitting the data block, with the header attached, according to the predefined route.

7. A method comprising:
   receiving, by a first hop router, a request for a tag, wherein the request is associated with routing a data block via a predefined route;
   creating, by the first hop router, an interface in response to the request;
   allocating, by the first hop router, the tag, wherein the tag is associated with the interface;
   providing, by the first hop router, the tag in response to the request;
   receiving, via the interface of the first hop router, a header corresponding to the tag;
   receiving, via the interface of the first hop router, the data block with the tag attached;
   removing, by the first hop router, the tag from the data block;
   selecting, by the first hop router, the header corresponding to the tag according to the interface;
   attaching, by the first hop router, the header to the data block; and
   transmitting, by the first hop router, the data block with the header attached.

8. The method of claim 7, wherein the header comprises routing information for the data block.

9. The method of claim 7, wherein the data block with the header attached is transmitted according to the information in the header.

10. The method of claim 7, wherein the tag comprises a virtual local area network (VLAN) tag.

11. The method of claim 7, wherein the request is via a hypertext transfer protocol (HTTP).

12. The method of claim 7, wherein the interface is a logical interface.

13. A system comprising:
   at least one computing device configured to at least:
      transmit a request for a tag;
   a first hop router configured to at least:
      receive the request for the tag, wherein the request is associated with routing a data block via a predefined route;

create an interface in response to the request;

allocate the tag, wherein the tag is associated with the interface;

provide the tag in response to the request;

receive, via the interface, a header corresponding to the tag;

receive, via the interface, the data block with the tag attached;

remove the tag from the data block;

select the header corresponding to the tag according to the interface;

attach the header to the data block; and transmit the data block with the header attached.

14. The system of claim 13, wherein the header comprises routing information for the data block.

15. The system of claim 13, wherein the data block with the header attached is transmitted according to the information in the header.

16. The system of claim 13, wherein the tag comprises a virtual local area network (VLAN) tag.

17. The system of claim 13, wherein the request is via a hypertext transfer protocol (HTTP).

18. The system of claim 13, wherein the interface is a logical interface.

19. The system of claim 13, wherein the tag comprises a plurality of VLAN tags.

20. The system of claim 13, wherein the header is attached to the data block at a location different from which the tag was removed.

* * * * *